(12) United States Patent
Chang

(10) Patent No.: US 12,081,835 B2
(45) Date of Patent: Sep. 3, 2024

(54) INTERACTIVE METHOD, ELECTRONIC DEVICE AND STORAGE MEDIUM FOR OPENING A VIDEO SHARING ROOM

(71) Applicant: BEIJING ZITIAO NETWORK TECHNOLOGY CO., LTD., Beijing (CN)

(72) Inventor: Weiyi Chang, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 17/519,537

(22) Filed: Nov. 4, 2021

(65) Prior Publication Data

US 2022/0232286 A1  Jul. 21, 2022

(30) Foreign Application Priority Data

Jan. 15, 2021  (CN) .......................... 202110057879.3

(51) Int. Cl.
*H04N 5/445* (2011.01)
*G06F 3/00* (2006.01)
(Continued)

(52) U.S. Cl.
CPC ......... *H04N 21/472* (2013.01); *H04N 21/632* (2013.01)

(58) Field of Classification Search
CPC ........... H04N 21/472; H04N 21/47202; H04N 21/47205; H04N 21/4722; H04N 21/632;
(Continued)

(56) References Cited

U.S. PATENT DOCUMENTS 8,700,714 B1 * 4/2014 Pan .................. H04L 65/60
709/206
2009/0287790 A1  11/2009 Upton et al.
(Continued)

FOREIGN PATENT DOCUMENTS

CN   104125476 A   10/2014
CN   104238949 A   12/2014
(Continued)

OTHER PUBLICATIONS

International Search Report mailed Mar. 4, 2022 in PCT Application No. PCT/CN2022/070439, English translation (12 pages).
(Continued)

*Primary Examiner* — Gigi L Dubasky

(57) ABSTRACT

The embodiments of the present disclosure provide an interactive method, apparatus, electronic device, and storage medium. The method involves receiving a first trigger operation to open a target video room when a first video is played in a first video playback page; in response to the first trigger operation, opening the target video room for a end user, displaying a first display interface of the target video room, playing the first video in the first display interface, and display the first interactive control; switching the first video played in the first display interface to a second video when a video switching operation is received. By adopting above technical solutions, the embodiments of the present disclosure improve the convenience as users watch videos together with other users.

12 Claims, 11 Drawing Sheets

(51) Int. Cl.
 *G06F 13/00* (2006.01)
 *H04N 21/472* (2011.01)
 *H04N 21/63* (2011.01)

(58) Field of Classification Search
 CPC .......... H04N 21/4788; H04N 21/4312; H04N 21/485
 See application file for complete search history.

(56) References Cited

U.S. PATENT DOCUMENTS

| | | | |
|---|---|---|---|
| 2010/0083324 A1 | 4/2010 | Smith et al. | |
| 2013/0113989 A1* | 5/2013 | Hui | H04N 21/47 348/385.1 |
| 2014/0267550 A1* | 9/2014 | Nimri | H04N 7/152 348/14.09 |
| 2017/0195613 A1* | 7/2017 | Yang | H04N 5/268 |
| 2020/0213631 A1 | 7/2020 | Jung et al. | |
| 2020/0366963 A1* | 11/2020 | Liao | H04N 21/4312 |
| 2021/0281909 A1* | 9/2021 | Xiong | H04N 21/2743 |
| 2022/0232286 A1 | 7/2022 | Chang | |
| 2023/0308403 A1 | 9/2023 | Tao et al. | |

FOREIGN PATENT DOCUMENTS

| | | | |
|---|---|---|---|
| CN | 104780336 A | 7/2015 | |
| CN | 105530535 A | 4/2016 | |
| CN | 105898508 A | 8/2016 | |
| CN | 108449620 A | 8/2018 | |
| CN | 108667798 A | 10/2018 | |
| CN | 108668140 A | 10/2018 | |
| CN | 108768832 A | 11/2018 | |
| CN | 109151541 A | 1/2019 | |
| CN | 110719515 A * | 1/2020 | ......... H04N 21/4302 |
| CN | 110741648 A | 1/2020 | |
| CN | 111277884 A | 6/2020 | |
| CN | 111741351 A | 10/2020 | |
| CN | 111797271 A | 10/2020 | |
| CN | 111935536 A | 11/2020 | |
| CN | 112069353 A | 12/2020 | |
| CN | 112104904 A | 12/2020 | |
| CN | 112187619 A | 1/2021 | |
| CN | 108449620 B | 3/2021 | |
| CN | 112911368 A | 6/2021 | |
| EP | 3621309 A1 | 3/2020 | |
| JP | 2020-524450 A | 8/2020 | |
| WO | WO2019004783 A | 1/2019 | |
| WO | 2019004783 A1 | 3/2019 | |
| WO | WO2019192423 A1 | 10/2019 | |

OTHER PUBLICATIONS

First Office Action issued Nov. 17, 2022 in CN Application No. 202110057879.3, English translation (25 pages).
European Search Report for EP Patent Application No. 22738911.1, Issued on Feb. 27, 2024, 11 pages.

* cited by examiner

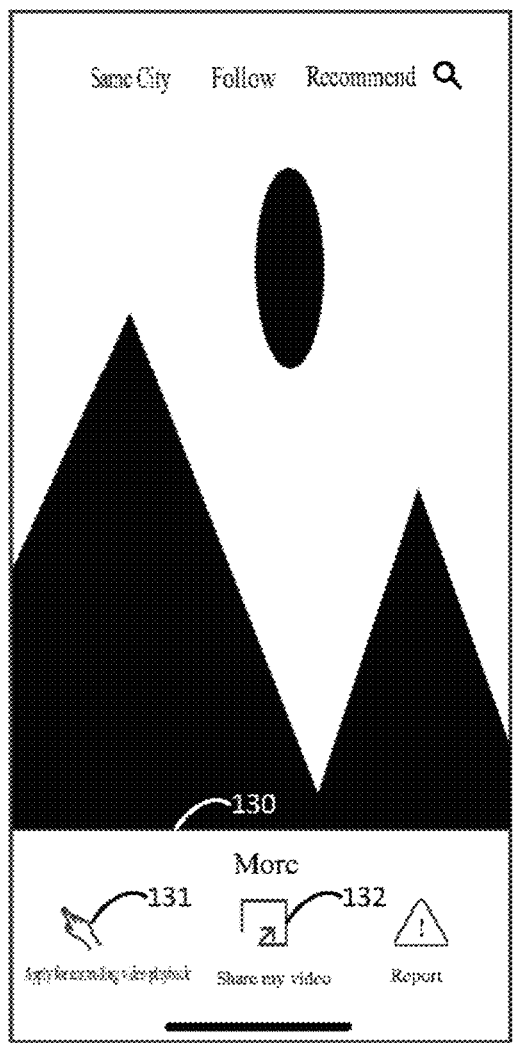
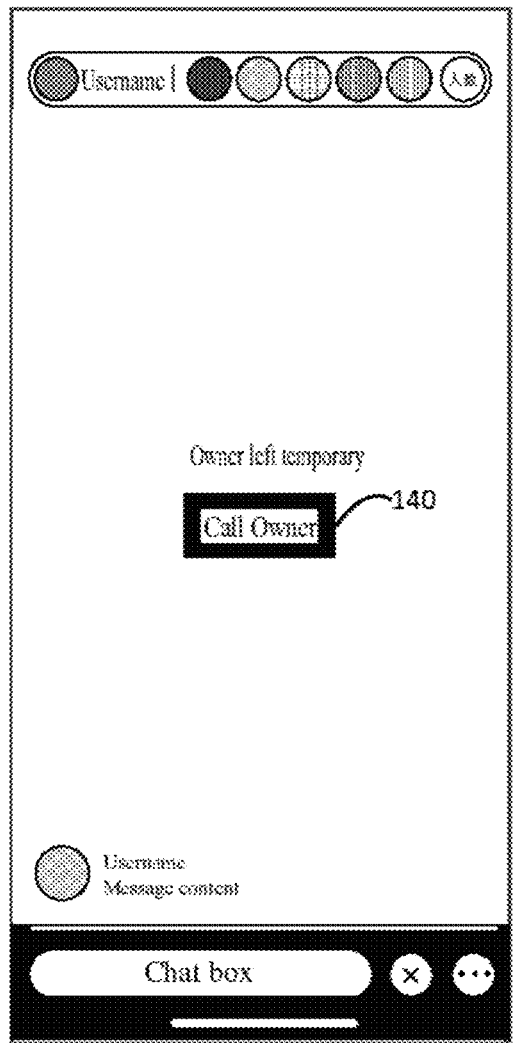
FIG.13          FIG.14
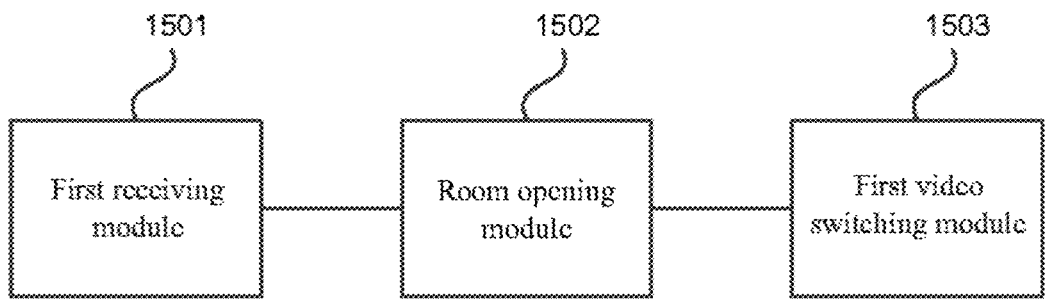
FIG.15

INTERACTIVE METHOD, ELECTRONIC DEVICE AND STORAGE MEDIUM FOR OPENING A VIDEO SHARING ROOM

CROSS-REFERENCE TO RELATED APPLICATIONS

This application claims the benefit of and priority from CN Patent Application Serial No. 202110057879.3 filed Jan. 15, 2021, entitled "INTERACTIVE METHOD, APPARATUS, ELECTRONIC DEVICE AND STORAGE MEDIUM" incorporated herein by reference in its entirety.

TECHNICAL FIELD

The embodiments of the present disclosure relate to the field of computer technology, and in particular, to an interactive method, apparatus, electronic device, and storage medium.

BACKGROUND

At present, video category application software provides users with the functionality of watching videos, so that users can watch videos in the video category application software. However, when a user watch a video, he/she can only share the video with other users by way of sending the video link or video password, and cannot invite other users to watch the video with him/her.

SUMMARY

The embodiments of the present disclosure provide an interactive method, apparatus, electronic device, and storage medium, so that a user can open a room when watching a video and invite other users to watch the video that he/she is watching and subsequently watching with him/her.

In a first aspect, an embodiment of the present disclosure provides an interactive method, comprising:
  receiving a first trigger operation to open a target video room when a first video is played in a first video playback interface, the first video playback interface having a first interactive control displayed therein;
  in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room;
  switching the first video played in the first display interface to a second video when a video switching operation is received, wherein the second video is used to be played on a peer terminal of individual peer users located within the target video room;

In a second aspect, an embodiment of the present disclosure provides an interactive method, comprising:
  receiving a third trigger operation to enter a target video room opened by a target user;
  in response to the third trigger operation, displaying a second display interface of the target video room, and playing the received first video in the second display interface, the first video being the video played within the target video room;
  playing a second video in the second display interface when it is detected that the first video is switched to the second video.

In a third aspect, an embodiment of the present disclosure further provides an interactive apparatus, comprising:
  a first receiving module configured to receive a first trigger operation to open a target video room when a first video is played in a first video playback interface, the first video playback interface having a first interactive control displayed therein;
  a room opening module configured to open the target video room for a local end user in response to the first trigger operation, display a first display interface of the target video room, play the first video in the first display interface, and display the first interactive control, wherein the first video is used to be played on a peer terminal of individual peer users located within the target video room;
  a first video switching module configured to switch the first video played in the first display interface to a second video when a video switching operation is received, wherein the second video is used to be played on a peer terminal of individual peer users within the target video room.

In a fourth aspect, an embodiment of the present disclosure further provides an interactive apparatus, comprising:
  a second receiving module configured to receive a third trigger operation to enter a target video room opened by a target user;
  an interface display module configured to display a second display interface of the target video room in response to the third trigger operation, and play the received first video in the second display interface, the first video being the video played within the target video room;
  a second video switching module configured to play a second video in the second display interface when it is detected that the first video is switched to the second video.

In a fifth aspect, an embodiment of the present disclosure further provides an electronic device, comprising:
  one or more processors;
  a memory used to store one or more programs,
  when the one or more programs are executed by the one or more processors, cause the one or more processors implement the interactive methods according to the embodiments of the present disclosure.

In a sixth aspect, an embodiment of the present disclosure further provides a computer-readable storage medium having a computer program stored thereon, which, when executed by a processor, implements the interactive methods according to the embodiments of the present disclosure.

An interactive method, apparatus, electronic device, and storage medium provided by embodiments of the present disclosure, receiving a first trigger operation to open a target video room when a first video is played in a first video playback interface, the first video playback interface having a first interactive control displayed therein; in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room; switching the first video played in the first display interface to a second video when a video switching operation is received, wherein the second video is used to be played on a peer terminal of individual peer users located within the target video room. By adopting the above-mentioned technical solutions in the embodiments of the present disclosure, a user can open a video room while watching a video and watch the video currently being watched and the video subsequently switched in the video room with other users, without the user having to select the video in advance, which can improve the convenience of users when watching videos with other users.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the like or similar reference signs indicate the like or similar elements. It should be understood that the drawings are schematic and the originals and elements are not necessarily drawn to scale.

FIG. 13 is a schematic diagram of a further window provided by an embodiment of the present disclosure;

FIG. 14 is a schematic diagram of another second display interface provided by an embodiment of the present disclosure;

FIG. 15 is a structural block diagram of an interactive apparatus provided by an embodiment of the disclosure;

DETAILED DESCRIPTION

Figure 1:
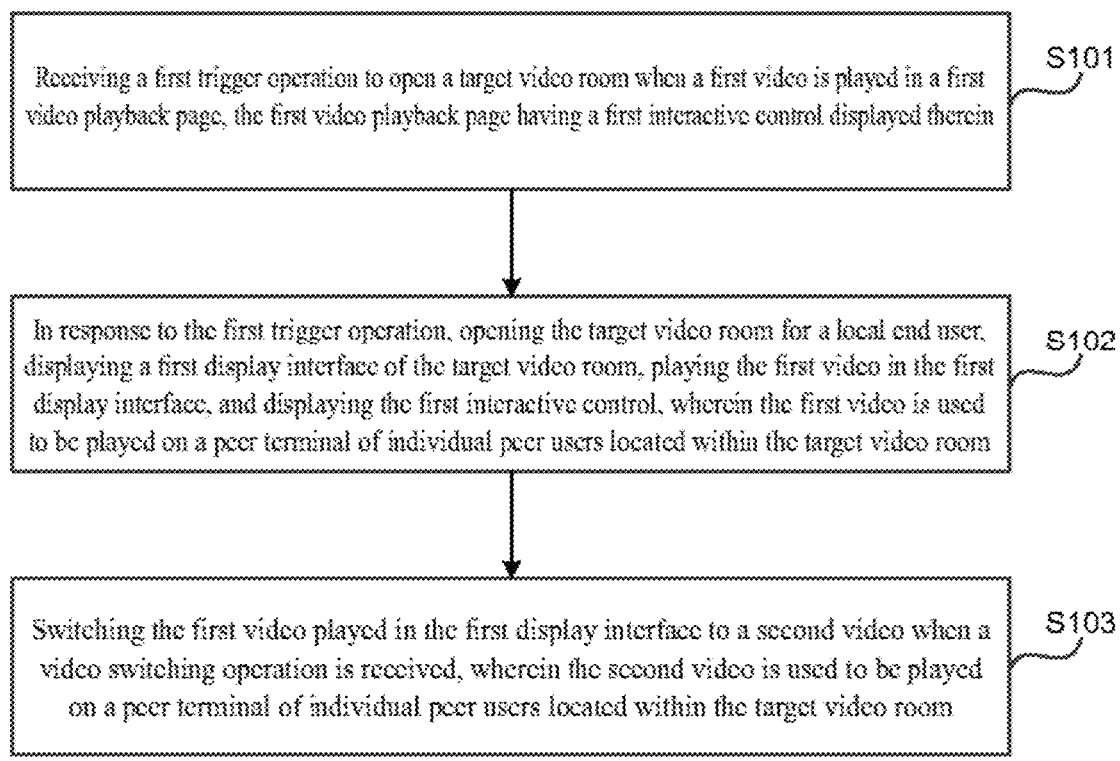
FIG. 1 is a schematic flowchart of an interactive method provided by an embodiment of the present disclosure.

Hereinafter, embodiments of the present disclosure will be described in more detail with reference to the accompanying drawings. Although some embodiments of the present disclosure are shown in the drawings, it should be understood that the present disclosure can be implemented in many different forms, which should not be construed as being limited to embodiments set forth herein, rather, these embodiments are provided for a more thorough and complete understanding of the present disclosure. It should be understood that the drawings and embodiments of the present disclosure should be explained as merely illustrative, and not as a limitation to the protection scope of the present disclosure.

It should be understood that various steps recited in the method embodiments of the present disclosure can be executed in a different order, and/or executed in parallel. In addition, the method implementations may include additional steps and/or omit to perform illustrated steps. The scope of the present disclosure is not limited in this respect.

The term "including" and its variants as used herein are open includes, that is, "including but not limited to". The term "based on" means "based at least in part on." The term "one embodiment" means "at least one embodiment"; the term "another embodiment" means "at least one additional embodiment"; the term "some embodiments" means "at least some embodiments." Related definitions of other terms will be given in following description.

It should be noted that the concepts of "first" and "second" etc. mentioned in the present disclosure are only used to distinguish between different apparatus, modules or units, and are not used to limit the order of functions performed by these apparatus, modules or units or their interdependence.

It should be noted that modifiers of "one" and "a plurality of" mentioned in the present disclosure are illustrative and not restrictive, and those skilled in the art should understand that they should be construed as "one or more" unless the context clearly indicates otherwise.

The names of messages or information interacted between a plurality of apparatus in the embodiments of the present disclosure are only used for illustration, and are not used to limit the scope of these messages or information.

FIG. 1 is a schematic flowchart of an interactive method provided by an embodiment of the disclosure. The method can be executed by an interactive apparatus, where the apparatus can be implemented by software and/or hardware, and can be configured in an electronic device; typically, it can be configured in a mobile phone or a tablet. The interactive method provided by an embodiment of the present disclosure is suitable for a scenario where a video room is opened to watch a video with other users. As shown in FIG. 1, the interactive method provided in this embodiment can comprise:

S101. receiving a first trigger operation to open a target video room when a first video is played in a first video playback interface, the first video playback interface having a first interactive control displayed therein.

wherein, the video room may be a room for multiple users to watch videos together. The first trigger operation can be any trigger operation for instructing electronics to open a video room for a local end user, such as a trigger operation that acts on a room opening control. The room opening control can be located on a video playback interface or a non-video playback interface, that is, a user can trigger the room opening control to open a video room when watching a video via a video playback interface or when viewing other interfaces. Hereinafter, take a room opening control being located in a video sharing window of a video playback interface as an example. At this time, the first video playback interface can be understood as a video playback interface currently displayed on local end, that is, the video playback interface where the local end user performs the first trigger operation, or other video playback interface switched to after the local end user performs the first trigger operation; the first video may be a video played in the first video playback interface, such as a short video played in the first video playback interface; the first interactive control may be understood as an interactive control displayed on the first video playback interface, and the interactive control may include a control that can be triggered to perform corresponding operations, such as a follow control for the publisher of the first video, a like control for the first video, a comment control for the first video, a repost control for the first video, and/or an interface switching control and the like.

Figures 2, 3:
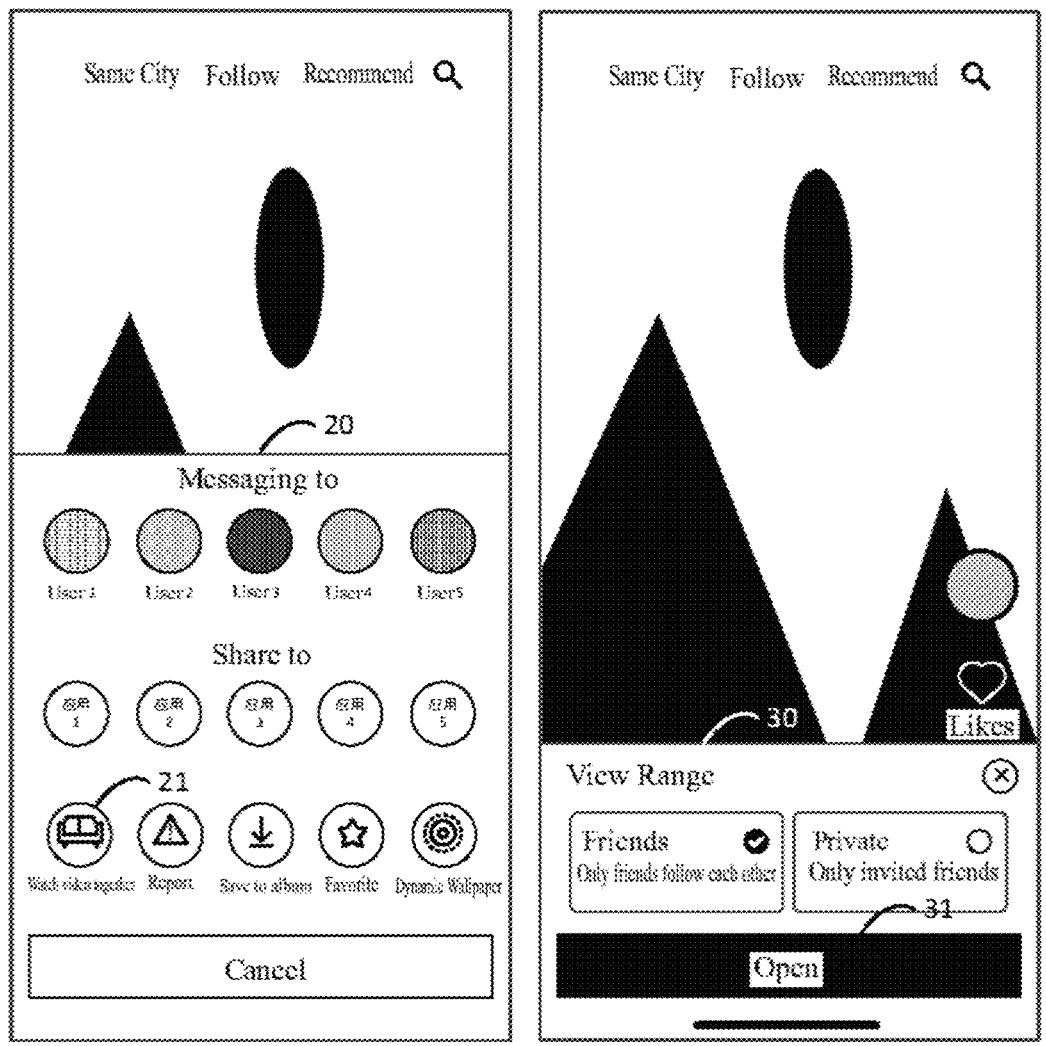
FIG. 2 is a schematic diagram of a sharing window provided by an embodiment of the present disclosure.
FIG. 3 is a schematic diagram of a room setting window provided by an embodiment of the disclosure.

Exemplarily, a local end user can watch a video on any video playback interface (such as a playback interface for recommended videos, a video playback interface for following users, or a playback interface for videos of the same city, etc.), and when he/she wants to watch the video he/she is watching and subsequent videos with other users, click a sharing control for the video currently played; when the electronic device (i.e., the electronic device corresponding to local end) detects that the local end user clicks the sharing control in the video playback interface, a sharing window 20 will be displayed, as shown in FIG. 2; thus, the local end user can further click a room opening control 21 displayed within the sharing window 20 to instruct the electronic device to open a video room; accordingly, when the electronic device detects that the user clicks the room opening control 21, it is determined that a first trigger operation to open a target video room is received.

S102. in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room.

wherein, the target video room can be understood as the video room opened by the local end user, that is, the video room of which the owner is the local end user. The first display interface can be understood as the display interface of the target video room on the local end user (i.e., the owner) side.

Exemplarily, when a electronic device receives a first trigger operation, it can open a target video room for a local end user, display a first display interface of the target video room, and continue to play a first video in the first display interface and display a first interactive control, and can send the first video to a peer terminal of individual peer users within the target video room in accordance with a preset sending mode, so as to play the first video on the peer terminal of individual peer users.

In this step, the way of sending the first video to individual peer users located within the target video room can be set flexibly. For example, the local end can receive the first video sent by the server and send the first video to individual peer terminals for playing based on communication addresses of the peer terminals of individual peer users located within the target video room; or send video identification information (such as video ID) of the first video played in the first video playback interface to a server, and send the first video to the peer terminals of individual peer users located within the target video room for playing via the server. In addition, when the local end sends the first video to individual peer terminals or sends the video identification information of the first video to the server, it can send playback progress information of the first video at the local end, so that individual peer terminals can play the first video synchronously with the local end; it is also possible not to send the playback progress information of the first video at the local end, so that individual peer users can watch their first video completely after entering the room.

In this embodiment, when sending the first video, other information displayed in the first display interface other than the information before video screen, such as a first interactive control, etc., may be sent or may not be sent. Preferably, the first interactive control may not be sent, so as to avoid the situation that the owner is seen by other users within the target video room when the owner is conducting interaction in the first display interface, thereby protecting the privacy of the owner.

Figure 4:
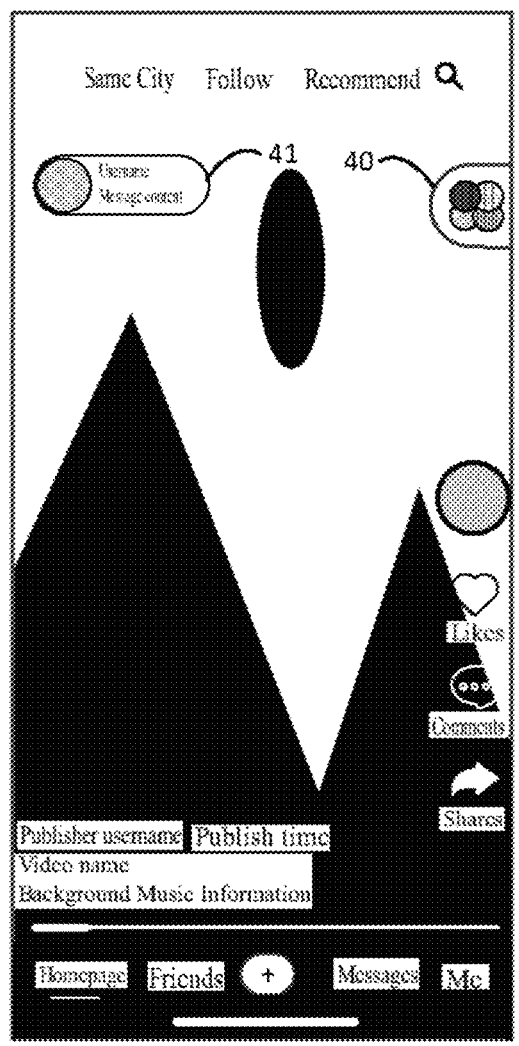
FIG. 4 is a schematic diagram of a first display interface provided by an embodiment of the disclosure.

In addition, when there are many types of video rooms (such as a friend room that all friends of the owner can enter or a private room that only friends invited by the owner can enter, etc.), after the electronic device receives the first trigger operation, a room setting window 30 can be further displayed, as shown in FIG. 3; thereby, the user can select the type of the video room to be opened through the room setting window 30, and click the opening control 31 displayed in the room setting window after the selection is accomplished; accordingly, when the electronic device detects that the user clicks on the opening control 31 displayed in the room setting window 30, it can open a target video room of the type selected by the local end user, and can send an invitation message to the local end user's friends or users invited by the local end user to invite the other parties to enter the target video room. As shown in FIG. 4, after the electronic device opens the target video room for the local end user, it can further turn on a microphone, and/or display a message input box (not shown in FIG. 4) and chat messages 41 sent by users within the target video room (including the local end user and peer users), for the user to make a voice call with the peer users who entered the target video room, and/or to send messages within the target video room to facilitate communications between individual users located within the target video room.

In addition, as shown in FIG. 4, after the electronic device opens the target video room for the local end user, it may further display a first room control 40 for the target video room in the first display interface, and may also display an avatar of at least one peer user who entered the target video room in a display area where the first room control 40 is located, to remind the local end user that the target video room has been opened and/or that there has been a peer user entered the target video room. Moreover, when it is detected that the user clicks on the first room control 40, the electronic device also displays user information of individual peer users located within the target video room for the local end user to view. At this time, preferably, after displaying of the first display interface of the target video room, the method further comprises: displaying a first room control in the first display interface, and displaying user information of individual peer users within the target video room when a first click operation acting on the first room control is detected. Wherein, the first room control can be understood as a room control displayed within the first display interface, that is, a room control displayed within the display interface on the owner side.

S103. switching the first video played in the first display interface to a second video when a video switching operation is received, wherein the second video is used to be played on a peer terminal of individual peer users located within the target video room.

Wherein, the video switching operation can be understood as a trigger operation for the user to switch the video played within the first display interface. The second video may be a video that needs to be switched to based on the video switching operation.

In this embodiment, after the local end user opens the target video room, the video played in the first display interface can be switched to switch the video played within the target video room, that is, to switch the video played on the display interface of the target video room displayed by the user terminals of individual users located within the target video room.

Specifically, when the local end user wants to switch the first video played in the first display interface, the video switching operation can be performed; accordingly, when the electronic device detects that the local end user performs the video switching operation, it can switch the first video played in the first display interface to the second video, and send the second video to the peer terminals of individual peer users located within the target video room for playing.

An interactive method provided in an embodiment, receiving a first trigger operation to open a target video room when a first video is played in a first video playback interface, the first video playback interface displayed having a first interactive control displayed therein; in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room; switching the first video played in the first display interface to a second video when a video switching operation is received, wherein the second video is used to be played on a peer terminal of individual peer users located within the target video room. By adopting the above-mentioned technical solution in this embodiment, a user can open a video room while watching a video and watch the video currently being watched and the video subsequently switched in the video room with other users, without the user having to select the video in advance, which can improve the convenience of users when watching videos with other users.

Figure 5:
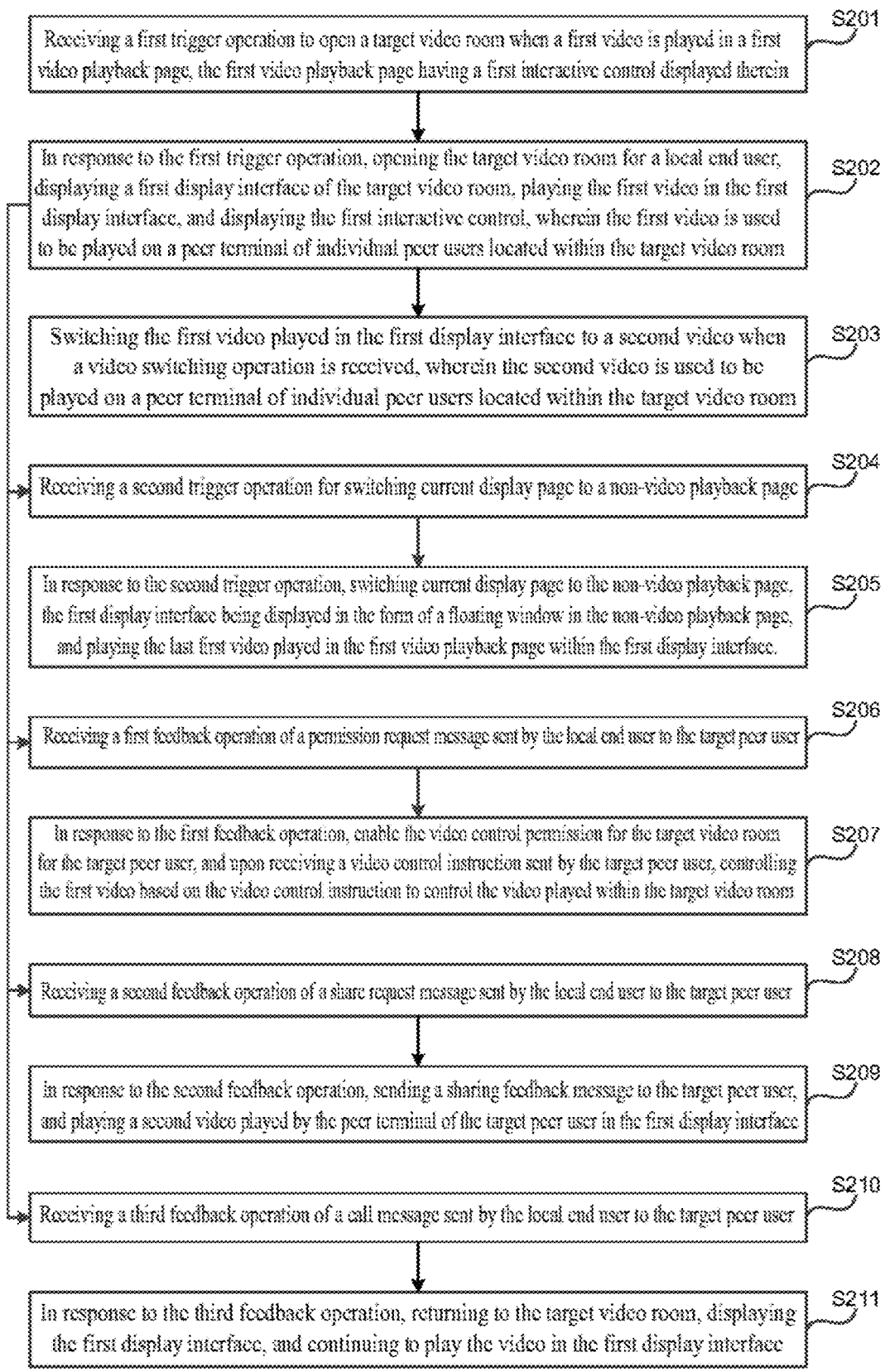
FIG. 5 is a schematic flowchart of another interactive method provided by an embodiment of the present disclosure.

FIG. 5 is a schematic flowchart of another interactive method provided by an embodiment of the disclosure. The solution in this embodiment can be combined with one or more optional solutions in the foregoing embodiments. Optionally, after the opening the target video room for the local end user, the method further comprises: receiving a second trigger operation for switching current display interface to a non-video playback interface; in response to the second trigger operation, switching current display interface to the non-video playback interface, displaying the first display interface in the form of a floating window in the non-video playback interface, and playing the last first video played in the first video playback interface within the first display interface.

Optionally, after the opening the target video room for the local end user, the method further comprises: after the opening the target video room for the local end user, the method further comprises: receiving a first feedback operation of a permission request message sent by the local end user to the target peer user; in response to the first feedback operation, enabling the video control permission for the target video room for the target peer user, and upon receiving a video control instruction sent by the target peer user, controlling the first video based on the video control instruction to control the video played within the target video room.

Optionally, after the opening the target video room for the local end user, the method further comprises: after the opening the target video room for the local end user, the method further comprises: receiving a second feedback operation of a share request message sent by the local end user to the target peer user; in response to the second feedback operation, sending a sharing feedback message to the target peer user, and playing a second video played by the peer terminal of the target peer user in the first display interface.

Optionally, after the opening the target video room for the local end user, the method further comprises: receiving a third feedback operation of a call message sent by the local end user to the target peer user; in response to the third feedback operation, returning to the target video room, displaying the first display interface, and continuing to play the video in the first display interface.

Accordingly, as shown in FIG. 5, the interactive method provided in this embodiment can comprise:

S201. receiving a first trigger operation to open a target video room when a first video is played in a first video playback interface, the first video playback interface having a first interactive control displayed therein.

S202. in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room, and S203, S204, S206, S208, or S210 are executed.

S203. switching the first video played in the first display interface to a second video when a video switching operation is received, wherein the second video is used to be played on a peer terminal of individual peer users located within the target video room.

S204. receiving a second trigger operation for switching current display interface to a non-video playback interface.

S205. in response to the second trigger operation, switching current display interface to the non-video playback interface, the first display interface being displayed in the form of a floating window in the non-video playback interface, and playing the last first video played in the first video playback interface within the first display interface.

wherein, the second trigger operation can be any operation that switches current display interface to a non-video playback interface, for example, an operation that switches current display interface from the first display interface to a certain non-video playback interface. The non-video playback interface can be any interface other than the video playback interface, such as a messages interface, a friends interface, a personal home interface of the local end user, or a personal home interface of other users.

Figure 6:
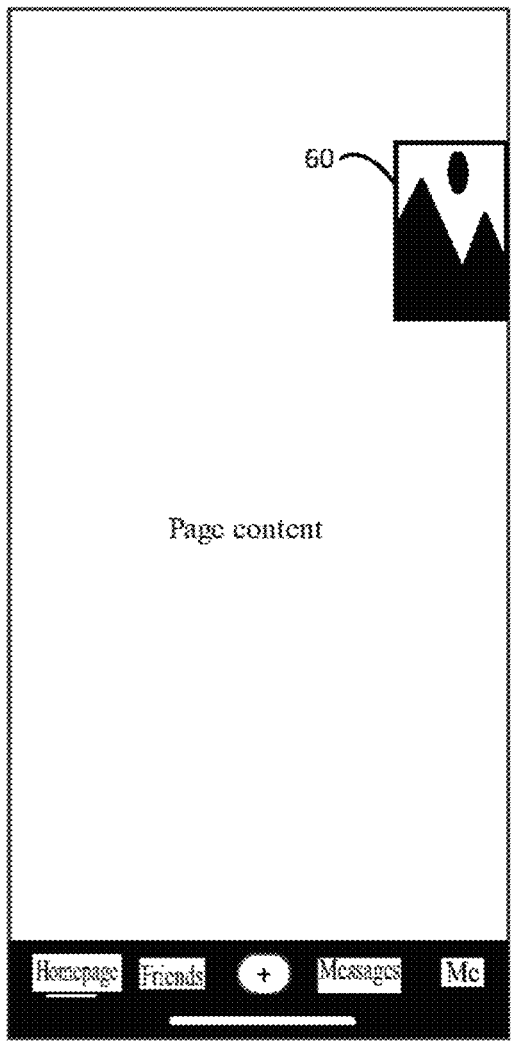
FIG. 6 is a schematic diagram of a non-video playback interface provided by an embodiment of the disclosure.

Specifically, the electronic device displays the first display interface; when the local end user wants to switch current display interface from the first display interface to other non-video playback interface, he/she can perform the operation of switching current display interface to corresponding non-video playback interface; accordingly, when the electronic device detects that the user performs the operation to switch current display interface to a certain non-video playback interface, it determines that a second trigger operation is received, and in response to the second trigger operation, the current display interface is switched from the first display interface to the non-video playback interface, and the first display interface 60 of the target video room is displayed in the form of a floating window on the non-video playback interface, as shown in FIG. 6 (FIG. 6 does not specifically show other content displayed in the non-video playback interface), and the last first video played in the first display interface is played in the floating window, for example, the video played in the first display interface when the current display interface was switched from the first display interface to the non-video playback interface is cyclically played in the floating window until the local end user controls the electronic device to switch the current display interface to a certain video playback interface or the local end user exits the target video room.

Here, after the local end user controls the electronic device to switch the current display interface to a certain video playback interface, the first display interface of the target video room can be displayed, and an interactive control in the video playback interface can be displayed in the first display interface, and the video played on the video playback interface is played, to play the video in the video playback interface within the target video room.

In this embodiment, when the target video room is opened, the local end user can continue to perform original operation path, such as performing interactive operations such as like, repost, or comment, etc., or switching the video played in the first display interface, or, switch the current display interface from the first display interface to other video playback interfaces or non-video playback interfaces, which will not cause the local end user to exit the target video room, thereby improving the experience of the local end user (i.e., the owner) watching a video with other users in the video room, thereby increasing the user's willingness to open a video room.

S206. receiving a first feedback operation of a permission request message sent by the local end user to the target peer user.

S207. in response to the first feedback operation, enable the video control permission for the target video room for the target peer user, and upon receiving a video control instruction sent by the target peer user, controlling the first video based on the video control instruction to control the video played within the target video room.

wherein, the target peer user can be understood as a user who sends a permission request message within the target video room. The permission request message can be understood as a message used to apply for a control permission of the video played within the target video room on the local end. The control permission may include the right to control video switching, video playback/pause playback, or video playback progress, etc., which can be sent when the target peer user wants to control the video played by the local end within the target video room. The first feedback operation can be understood as the trigger operation that the local end user agrees the target peer user to control the video played by the local end within the target video room, that is, the operation that the local end user agrees to grant the target peer user the first video control permission, such as the operation that the local end user clicks on a first pass control corresponding to the permission request message. The video control instruction may be an instruction to control the video played within the target video room.

Figure 7:
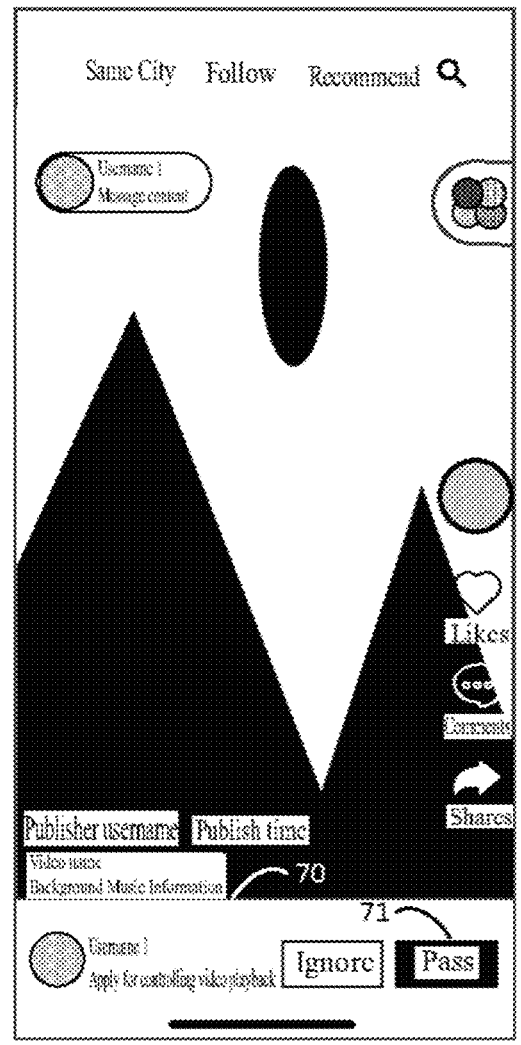
FIG. 7 is a schematic diagram of a permission request message provided by an embodiment of the present disclosure.

Exemplarily, when the target peer user wants to control the video played by the local end, he/she instructs the peer terminal of the target peer user to generate a permission request message and send the permission request message to the local end by performing a corresponding trigger operation; the local end receives and displays the permission request message 70, as shown in FIG. 7, and when it detects that the user clicks on the first pass control 71 corresponding to the permission request message 70, it determines that the first feedback operation is received, enables the video control permission for the target peer user, and can send a corresponding feedback message to the peer terminal of the target peer user; the peer terminal of the first user displays a prompt message after receiving the feedback message sent by the local end to remind the target peer user that the request for the video control permission is passed; the target peer user can perform corresponding control operation when he/she wants to control the first video played by the local end, such as sliding up and down, etc.; when the peer terminal of the target peer user detects that a control operation of the target peer user, it can generate a video control instruction corresponding to the control operation, such as a video switching instruction, and send the video control instruction to the local end; accordingly, when the local end receives the video control instruction sent by the target terminal of the target peer user, it can control the first video based on the video control instruction, such as switching the currently playing first video to its previous video or next video, etc., and control the peer terminals of individual peer users within the target video room to play the video switched to.

It is understood that when a local end user enables a video control permission for a target peer user, both the local end user and the target peer user can control a video played within the target video room; and, when the target peer user is not desired to control the video played within the target video room, the local end user can also perform a corresponding trigger operation to instruct the electronic device to disable the video control permission for the target peer user.

S208. receiving a second feedback operation of a share request message sent by the local end user to the target peer user.

S209. in response to the second feedback operation, sending a sharing feedback message to the target peer user, and playing a second video played by the peer terminal of the target peer user in the first display interface.

wherein, the sharing request message may be a message for applying to share a video within the target video room. The second feedback operation may be a trigger operation that the local end user agrees to the target peer user to share a video, such as the operation that the local end user clicks on a second pass control corresponding to the sharing request message. Accordingly, the sharing feedback message may be a feedback message sent to the target peer user when the local end user agrees to the target peer user to share a video.

Figure 8:
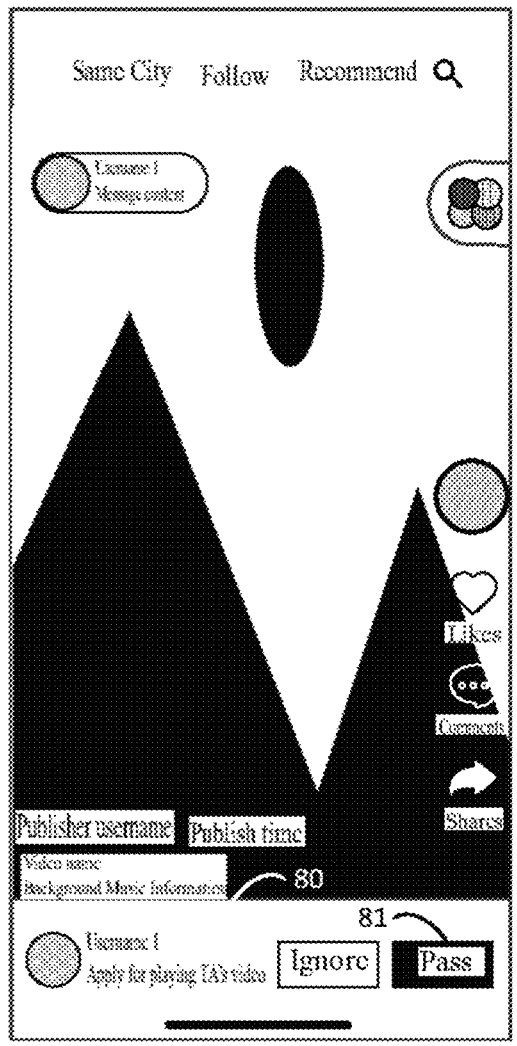
FIG. 8 is a schematic diagram of a sharing request message provided by an embodiment of the present disclosure.

Exemplarily, when the target peer user wants to share a video within the target video room, he/she instructs the peer terminal of the target peer user to generate a sharing request message and send the sharing request message to the local end by performing a corresponding trigger operation; the local end receives and displays the sharing request message 80, as shown in FIG. 8, and when it detects that the user clicks on the second pass control 81 corresponding to the sharing request message 80, it determines that a second feedback operation is received, sends a sharing feedback message to the peer terminal of the target peer user; after the peer terminal of the second user receives the sharing feedback message sent by the local end, it can display a prompt message to remind the target peer user that the sharing request is passed, and can display corresponding video playback interface based on corresponding control operation of the target peer user, and/or, when the corresponding control operation of the target peer user is not detected, a default video playback interface (such as a recommended video playback interface) or the interface displayed before entering the target video room is automatically displayed, and when the currently displayed interface is a certain video playback interface, a second display interface of the target video room is displayed, and an interactive control in the video playback interface is displayed in the second display interface, and the second video played in the video playback interface is played in the second display interface, and the second video played in the second display interface is sent to user terminals of other users (including the local end user) within the target video room for playing; accordingly, when the local end receives the second video sent by the peer terminal of the target peer user, the second video can be played in the first display interface.

It is understood that after a local end user agrees to a target peer user to share a video, when the local end user wants to continue to share a video at the local end, the local end user can also perform a corresponding trigger operation to instruct the electronic device to again switch the video played in the first display interface to the video played in a certain video playback interface of the local end, and send the video to the peer terminals of individual peer users located within the target video room for playback.

S210. receiving a third feedback operation of a call message sent by the local end user to the target peer user.

S211. in response to the third feedback operation, returning to the target video room, displaying the first display interface, and continuing to play the video in the first display interface.

wherein, the call message can be used to call the owner of the target video room (i.e., the local end user) to return to the target video room, which can be sent by any peer user (i.e., the target peer user) located within the target video room to the local end user when the local end user leaves the target video room, such as when the local end user shuts down the client that executes this interactive method. The third feedback operation may be a trigger operation for the local end user to return to the target video room, such as an operation for starting the client or a trigger operation for triggering an access control corresponding to the call message.

Figure 9:
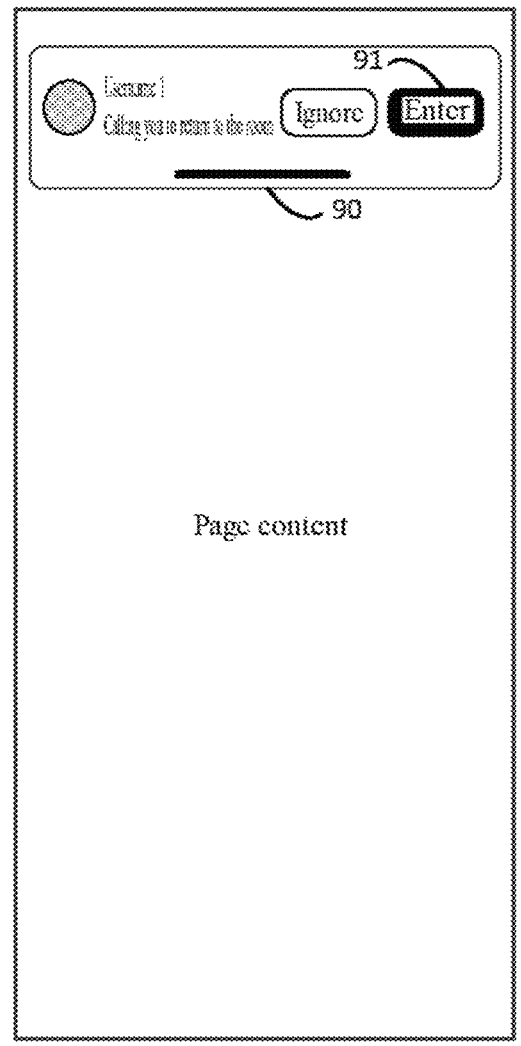
FIG. 9 is a schematic diagram of a call message provided by an embodiment of the disclosure.

Exemplarily, when the local end user leaves the target video room, individual peer users located within the target video room can send a call message to the local end; accordingly, the local end can display the call message 90 to the local end user after receiving the call message 90, as shown in FIG. 9; therefore, when the local end user wants to return to the target video room, he/she can click the access control 91 corresponding to the call message 90; accordingly, when the local end detects that the local end user is clicking on the access control 91, it can be determined that a third trigger operation is received. In response to the third trigger operation, enter the target video room (for example, re-establish a communication connection with the target video room), and display the first display interface of the target video room, continue to play the video in the first display interface, and continue to send the video played in the first display interface to the peer terminals of the peer users located within the target video room for playback.

In addition, if the owner leaves the opened video room (including the target video room) for a preset period of time (such as 3 minutes or 5 minutes, etc.) and still not return to the video room, the video room can be closed. Moreover, the user can also perform corresponding trigger operations, such as through clicking a room close control within the room setting window of the target video room to instruct the electronic device to close the target video room, which the room setting window can be displayed when it is detected that the local end user clicks on room identifier displayed within the video playback interface.

In the interactive method provided in this embodiment, when switching to a non-video playback interface, the first display interface of the video room is displayed in the form of a floating window, which can ensure that the user can continue to stay in the video room after switching the first display interface to other display interfaces; moreover, non-owners located in the video room can apply to the owner to control the video played on the owner side, and further to control the video played within the target video room, or, apply to the owner to play a video from own side within the target video room, and can the owner to return to the video room after the owner left the room, which can further improve user experience.

Figure 10:
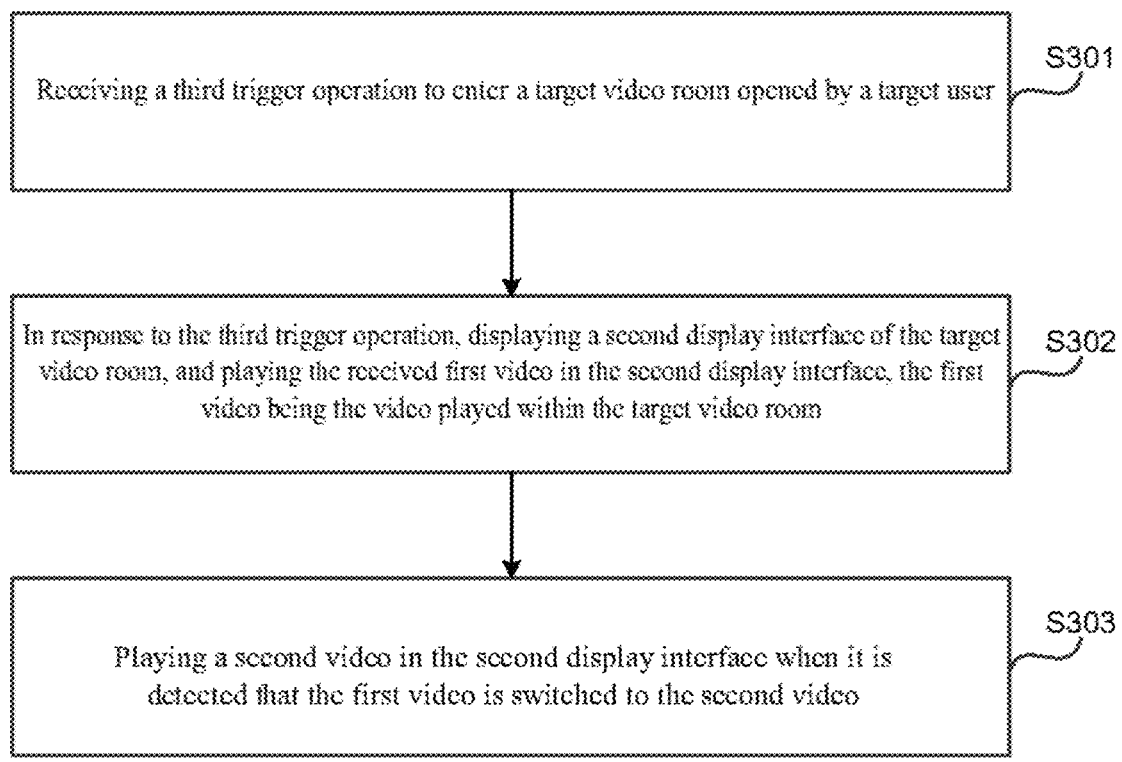
FIG. 10 is a schematic flowchart of yet another interactive method provided by an embodiment of the present disclosure.

FIG. 10 is a schematic flowchart of an interactive method provided by an embodiment of the disclosure. The method can be executed by an interactive apparatus, where the apparatus can be implemented by software and/or hardware, and can be configured in an electronic device, typically, it can be configured in a mobile phone or a tablet. The interactive method provided by an embodiment of the present disclosure is suitable for a scenario of entering a video room opened by another user and watching a video together with other users in the video room. As shown in FIG. 10, the interactive method provided in this embodiment can comprise:

S301. receiving a third trigger operation to enter a target video room opened by a target user.

S302. in response to the third trigger operation, displaying a second display interface of the target video room, and playing the received first video in the second display interface, the first video being the video played within the target video room.

wherein, the target video room can be understood as a video room corresponding to the third trigger operation, that is, a room that the local end user wants to enter through the third trigger operation. The second display interface may be a display interface of the target video room on the side of users other than the owner. The first video may be a video received by the local end within the target video room, that is, the video played within the target video room. Accordingly, the target user may be the owner of the target video room; the third trigger operation may be an operation to enter the target video room, such as clicking on a video viewing control corresponding to an invitation message sent by a target user, a video room notification interface displayed in the video stream for a target user, clicking on a friend list, a message list, or a second room control in a video playback interface for characterizing a video room opened by the target user to enter. When the user enters the target video room by clicking the second room control for the target video room displayed on the video playback interface, preferably, the third trigger operation is a second click operation acting on a second room control in a second video playback interface, and before the receiving the third trigger operation to enter the target video room opened by the target user, the method further comprises: displaying the second video playback interface, and displaying the second room control of the target video room in the second display interface. The second room control can be understood as a room control corresponding to the target video room on the side of users other than the room owner.

Figure 11:
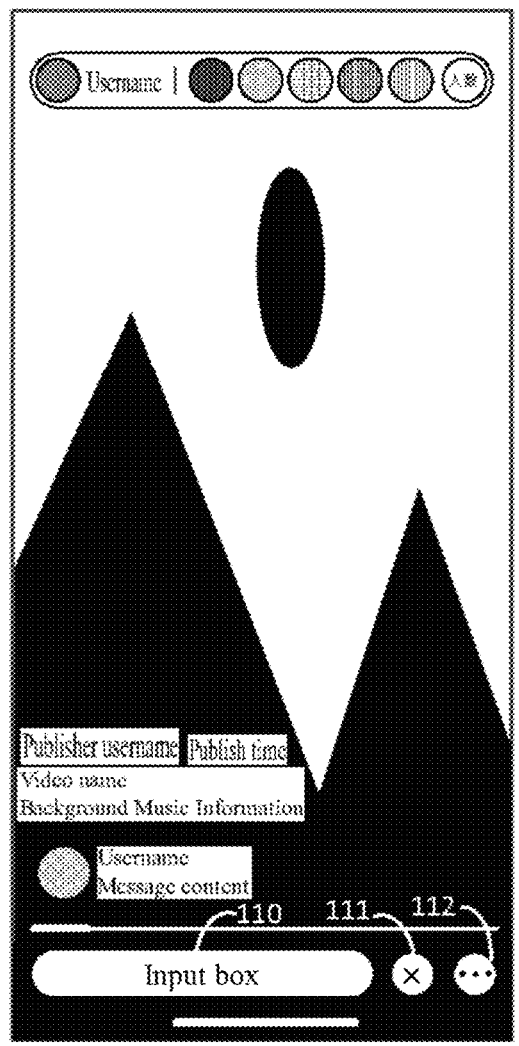
FIG. 11 is a schematic diagram of a second display interface provided by an embodiment of the present disclosure.

Specifically, when the local end user wants to enter the target video room opened by the target user to watch a video together with the target user, he/she can perform the third trigger operation; accordingly, when the electronic device detects that the user performs the third trigger operation, it can switch current display interface to the second display interface of the target video room, in which the video sent by the target user or other users within the target video room is played, as shown in FIG. 11. The microphone can further be turned on and can establish a voice call connection with each of other users within the target video room, so that the local end user and each of other users within the target video room can make a voice call while watching a video, and/or display a input box 110, so that the users are facilitated to input and send a chat message through the input box 110.

In addition, the second display interface of the target video room may further display an exit control 111, so that the local end user can exit the target video room by clicking on the exit control 111.

S303: playing a second video in the second display interface when it is detected that the first video is switched to the second video.

Exemplarily, when other users (including the target user) located within the target video room switch the first video played within the target video room to the second video, for example, when other users within the target video room send a second video to the local end within the target video room, the first video played in the second display interface can be switched to the second video.

In this embodiment, by adopting above technical solutions, a third trigger operation to enter the target video room opened by the target user is received, and in response to the third trigger operation, the second display interface of the target video room is displayed, and the received first video played within the target video room is played in the second display interface, and when it is detected that the first video is switched to the second video, the second video is played in the second display interface. In this embodiment, by adopting above technical solutions, different videos can be played in the display interface of the target video room, which can improve the experience of the user entering a room and watching a video together with other users.

Figure 12:
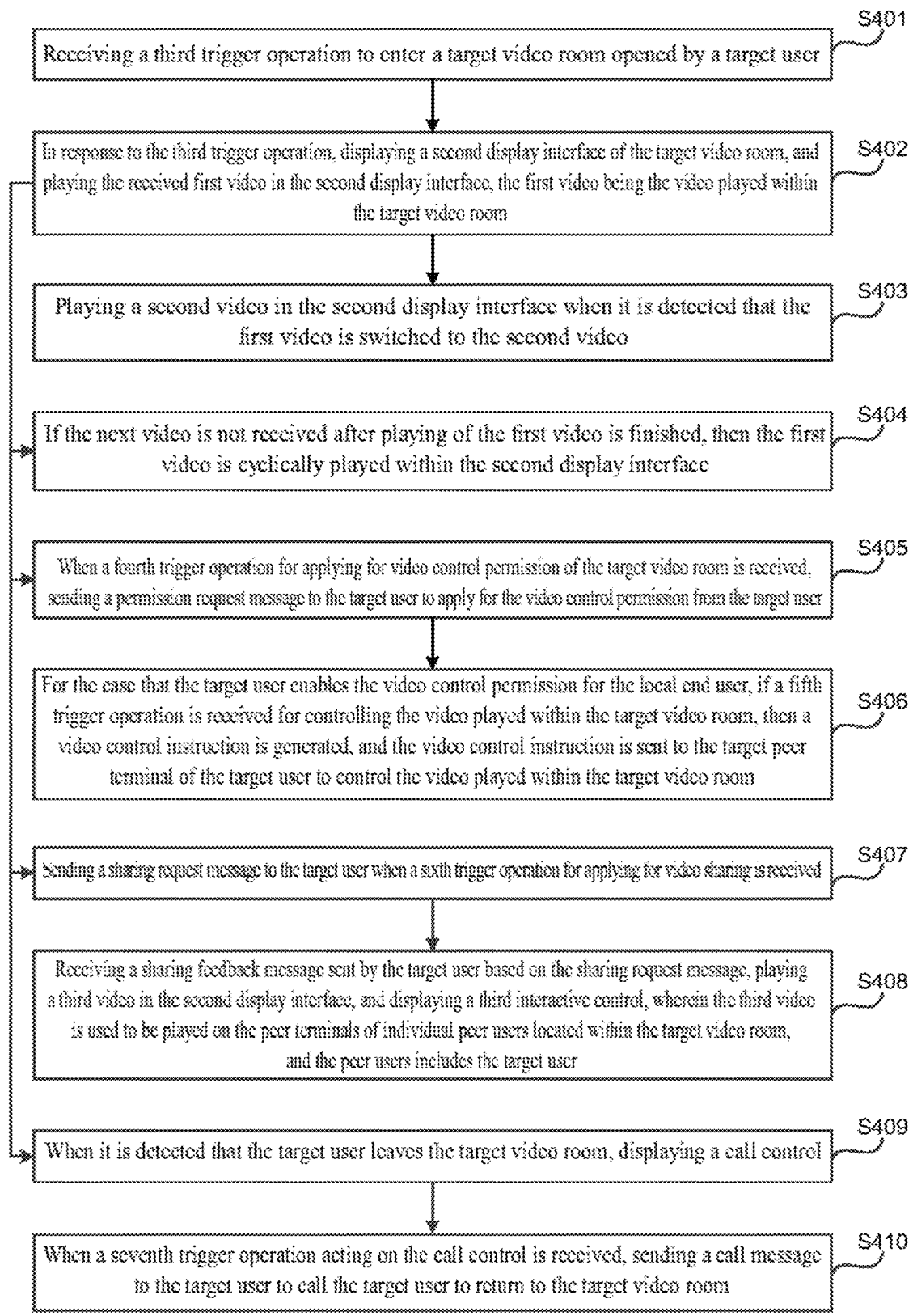
FIG. 12 is a schematic flowchart of a fourth interactive method provided by an embodiment of the present disclosure.

FIG. 12 is a schematic flowchart of another interactive method provided by an embodiment of the disclosure. The solution in this embodiment can be combined with one or more optional solutions in the foregoing embodiments. Optionally, after the received first video is played in the second display interface, the method further comprises: if the next video is not received after playing of the first video is finished, then the first video is cyclically played within the second display interface.

Optionally, after the displaying the second display interface of the target video room, the method further comprises: when a fourth trigger operation for applying for video control permission of the target video room is received, sending a permission request message to the target user to apply for the video control permission from the target user; for the case that the target user enables the video control permission for the local end user, if a fifth trigger operation is received for controlling the video played within the target video room, generating a video control instruction, and sending the video control instruction to the target peer terminal of the target user to control the video played within the target video room.

Optionally, after the displaying the second display interface of the target video room, the method further comprises: sending a sharing request message to the target user when a sixth trigger operation for applying for video sharing is received; receiving a sharing feedback message sent by the target user based on the sharing request message, playing a third video in the second display interface, and displaying a third interactive control, wherein the third video is used to be played on the peer terminals of individual peer users located within the target video room, and the peer users includes the target user.

Optionally, after the displaying the second display interface of the target video room, the method further comprises: when it is detected that the target user leaves the target video room, displaying a call control; when a seventh trigger operation acting on the call control is received, sending a call message to the target user to call the target user to return to the target video room.

Accordingly, as shown in FIG. 12, the interactive method provided in this embodiment can comprise:

S401. receiving a third trigger operation to enter a target video room opened by a target user.

S402. in response to the third trigger operation, displaying a second display interface of the target video room, and playing the received first video in the second display interface, the first video being the video played within the target video room, S403, S404, S405, S407 or S409 is executed.

S403: playing a second video in the second display interface when it is detected that the first video is switched to the second video.

S404: if the next video is not received after playing of the first video is finished, then the first video is cyclically played within the second display interface.

In this embodiment, after entering the target video room, the local end can play the received videos in the second display interface of the target video room in sequence according to the receiving order, and in a case that, after playing of the last video received is finished, it is still not received the next video sent by other users within the target video room, the last video received is cyclically played until the next video is received, so as to avoid a situation that there is no video being playing in the second display interface of the target video room, which further improves the experience of the user when watching a video with other users.

S405. when a fourth trigger operation for applying for video control permission of the target video room is received, sending a permission request message to the target user to apply for the video control permission from the target user.

wherein, the video control permission can be understood as a control permission for the video played by the target user within the target video room, such as the control permission for video switching, video playback/pausing playback, or video playback progress etc., of the video played within the target video room. The fourth trigger operation can be any trigger operation that instructs the electronic device to apply for video control permission, such as a trigger operation of clicking on a permission request control displayed within the second display interface of the target video room, which the permission request control can be displayed within more windows of the second display interface of the target video room. The permission request message may be a message used to apply from the target user for a control permission for the video played within the target video room.

In this embodiment, users other than the owner who are located in a certain video room can apply from the owner for the control permission for the video played within the target video room. Specifically, the electronic device displays the second display interface of the target video room and plays the video in the second display interface. When the local end user wants to apply for a control permission for the video played within the target video room, he/she can click on a more control 112 displayed within the second display interface of the second room, as shown in FIG. 11, thereby instructing the electronic device to show a more window 130, as shown in FIG. 13, and click on a permission request control 131 displayed in the more window 130; accordingly, when the electronic device detects that the local end user clicks on the permission request control 131, it can be determined that the fourth trigger operation for applying for a video control permission for the target video room is received, and in response to the fourth trigger operation, generating a permission request message, and sending the permission request message to the target peer terminal of the target user for display, so as to apply for the video control permission from the target user.

S406. for the case that the target user enables the video control permission for the local end user, if a fifth trigger operation is received for controlling the video played within the target video room, then a video control instruction is generated, and the video control instruction is sent to the target peer terminal of the target user to control the video played within the target video room.

wherein, the fifth trigger operation can be understood as an operation for the user to control the video played within the target video room, such as a sliding up and down operation for switching the video played within the target video room, a click operation for adjusting the video played within the target video room to a playback state/pause state, or an operation of dragging the playback progress bar of the video played within the target video room for adjusting the playback progress of the video played within the target video room, etc. The video control instruction can be understood as an instruction to control the video played within the target video room. The target peer terminal can be understood as the user terminal of the target user.

Exemplarily, after an electronic device sends a permission request message to a target user, it can detect whether the target user has enabled a video control permission for a local end user, and when it detects that the target user has enabled the video control permission for the local end user, such as when receiving a feedback message sent from a peer terminal of the target user that grants the local end user with the video control permission, it displays a corresponding prompt message to remind the local end user that the target user has enabled the video control permission for him/her. When the local end user wants to control the video played within the target video room after the video control permission is enabled, he/she can execute corresponding trigger operation. Accordingly, when the electronic device detects that the local end user performs a fifth trigger operation for controlling the video played within the target video room, it can generate a video control instruction corresponding to the fifth trigger operation, and send the video control instruction to the target peer terminal of the target user. Therefore, after the target peer terminal receives the video control instruction sent by the local end, it can control the video played in its video playback interface based on the video control instruction, and further control the video sent by the target peer terminal to the user terminal of each of the users located within the target video room.

S407. sending a sharing request message to the target user when a sixth trigger operation for applying for video sharing is received.

wherein, the sixth trigger operation can be any trigger operation that instructs the electronic device to apply for sharing video within the target video room, such as a trigger operation that clicks on the sharing request control displayed within the second display interface of the target video room, which the sharing request control can be displayed within a more window on the room interface of the target video room. The sharing request message may be a message for applying from the target user for sharing a video within the target video room.

In this embodiment, users other than the owner (i.e., non-owner) located in a certain video room can apply from the owner for sharing a video from their own terminals. Specifically, the electronic device displays the second display interface of the target video room and plays videos shared by other users (including the target user) within the second display interface. When the local end user wants to apply for sharing a video, he/she can click on a more control 112 displayed with the second display interface of the second video room, as shown in FIG. 11, thereby instructing the electronic device to display a more windows 130, as shown in FIG. 13. and click a sharing request control 132 displayed with the more window 130; accordingly, when the electronic device detects that the local end user clicks on the sharing request control 132, it can be determined that a sixth trigger operation for applying for sharing a video within the target video room is received, and in response to the sixth trigger operation, it generates a sharing request message, and sends the sharing request message to the target peer terminal of the target user for display, so as to apply from the target user for sharing a video.

S408. receiving a sharing feedback message sent by the target user based on the sharing request message, playing a third video in the second display interface, and displaying a third interactive control, wherein the third video is used to be played on the peer terminals of individual peer users located within the target video room, and the peer users includes the target user.

wherein, the sharing feedback message may be a feedback message sent by the target user when agreeing to the local end user to share a video. The third video playback interface can be a video playback interface of the local end, such as the preset video playback interface, a video playback interface displayed before the second display interface of the target video room is displayed, or a video playback interface to which it is switched based on an interface switching operation of the local end user, accordingly, the fourth video can be a video played in the third video playback interface.

Exemplarily, after an electronic device receives a sharing feedback message sent by a target user, it can switch current display interface directly or indirectly from an second display interface to a third video playback interface automatically or based on a trigger operation of a local end user to switch current display interface, and send a fourth video played in a third video playback interface to a peer terminal of individual peer users (including the target user) located within a target video room for display.

S409: when it is detected that the target user leaves the target video room, displaying a call control.

In this embodiment, as shown in FIG. 14, when the electronic device detects that the target user (i.e., the owner) leaves the target video room, it can display the call control 140, to facilitate the local end user to instruct the electronic device to send a call message to the target user by triggering the call control 140. Wherein, the way of detecting whether the target user leaves the target video room can be flexibly set as desired. For example, when the local end has established a voice call connection with the target peer terminal of the target user, it can be determined that the target user left the target video room when it is detected that the voice call with the target user is disconnected, and display a call control; when the local end does not establish a voice call connection with the target terminal of the target user, a server can be used to detected whether the target user has left the target video room, and when it is detected that the target user leaves the target video room, it sends a prompt message to each user located within the target video room. Accordingly, the local end can determine that the target user leaves the target video room and display the call control as soon as receiving the prompt message sent by the server.

In addition, when it is detected that the target user leaves the target video room, it can also stop playing the video and displaying the video screen in the room of the target video room, as shown in FIG. 14, so that users can further recognize the situation that the owner leaves the video room, and call the owner to return to the video room in time.

S410: when a seventh trigger operation acting on the call control is received, sending a call message to the target user to call the target user to return to the target video room.

wherein, the seventh trigger operation may be an operation that triggers a call control, such as a click operation acting on the call control. The call message can be understood as a call message for reminding the target user to return to the target video room.

In this embodiment, after the owner of the video room leaves the video room, other users in the room can call the owner to return to the video room. Specifically, the electronic device displays a call control; when the local end user wants to call the target user to return to the target video room, he/she can click on the call control; accordingly, when the electronic device detects that the local end user clicks on the call control, it can be determined that a seven trigger operation is received, and in response to the seven trigger operation, it generates a call message and sends the call message to the target user; thereby, the target user can return to the target video room by clicking on an access control corresponding to the call message to continue to send video.

In the interactive method provided by this embodiment, when next video is not received, the last received video is cyclically played in the second display interface of the video room, and the non-owner in the video room can apply from the owner for controlling the video played on the owner side, and further controlling the video played within the target video room, or can apply from the owner for playing own video within the target video room, and can call the owner to return to the video room after the owner left the room, which can further improves the user's usage experience.

FIG. 15 is a structural block diagram of an interactive apparatus provided by an embodiment of the disclosure. The apparatus can be implemented by software and/or hardware, and can be configured in an electronic device; typically, it can be configured in a mobile phone or a tablet. Interaction can be achieved by implementing interactive methods. As shown in FIG. 15, the interactive apparatus provided in this embodiment can comprise: a first receiving module 1501, a room opening module 1502, and a first video switching module 1503, wherein:

The first receiving module 1501 is configured to receive a first trigger operation to open a target video room when a first video is played in a first video playback interface, the first video playback interface having a first interactive control displayed therein;

The room opening module 1502 is configured to open the target video room for a local end user in response to the first trigger operation, display a first display interface of the target video room, play the first video in the first display interface, and display the first interactive control, wherein the first video is used to be played on a peer terminal of individual peer users located within the target video room;

The first video switching module 1503 is configured to switch the first video played in the first display interface to a second video when a video switching operation is received, where the second video is used to be played on a peer terminal of individual peer users within the target video room.

In the interactive apparatus provided in this embodiment, through the first receiving module, receiving a first trigger operation to open a target video room when a first video is played in a first video playback interface, the first video playback interface having a first interactive control displayed therein; through the room opening control, in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room; through the first video switching control, switching the first video played in the first display interface to a second video when a video switching operation is received, wherein the second video is used to be played on a peer terminal of individual peer users located within the target video room. By adopting the above-mentioned technical solutions in this embodiment, a user can open a video room while watching a video and watch the video currently being watched and the video subsequently switched in the video room with other users, without the user having to select the video in advance, which can improve the convenience of users when watching videos with other users.

Further, the interactive apparatus provided in this embodiment can further comprise: a third receiving module, configured to receive, after the target video room is opened for the local end user, a second trigger operation that switches current display interface to a non-video playback interface; an interface switching module, configured to switch the current display interface to the non-video playback interface in response to the second trigger operation, display the first display interface in the form of a floating window in the non-video playback interface, and play the last first video played in the first video playback interface within the first display interface.

Further, the interactive apparatus provided in this embodiment can further comprise: a first feedback module, configured to receive, after the opening the target video room for the local end user, a first feedback operation for the permission request message sent by the local end user to the target peer user; an instruction receiving module, configured to, in response to the first feedback operation, open a video control permission for the target video room for the target peer user, and after receiving the video control instruction sent by the target peer user, control the first video based on the video control instruction, to control the video played within the target video room.

Further, the interactive apparatus provided in this embodiment can further comprise: a second feedback module, configured to receive, after the opening the target video room for the local end user, a second feedback operation for the sharing request message sent by the local end user to the target peer user; a message sending module, configured to, in response to the second feedback operation, send a sharing feedback message to the target peer user, and play the second video played by the peer terminal of the target peer users in the first display interface.

Further, the interactive apparatus provided in this embodiment can further comprise: a third feedback module, configured to receive, after the opening the target video room for the local end user, a third feedback operation for the call message sent by the local end user to the target peer user; a room return module, configured to, in response to the third feedback operation, return to the target video room, display the first display interface, and continue to play video in the first display interface.

Further, the interactive apparatus provided in this embodiment can further comprise: an information display module, configured to, after the displaying the first display interface of the target video room, display a first room control in the first display interface, and when a first click operation acting on the first room control is detected, display user information of individual peer users located within the target video room.

The interactive apparatus provided by the embodiments of the present disclosure can execute the interactive methods provided by any embodiment of the present disclosure, and has functional modules and beneficial effects corresponding to implementation of the interactive methods. Technical details not described in detail in this embodiment can be referred to the interactive methods provided in any embodiment of the present disclosure.

Figure 16:
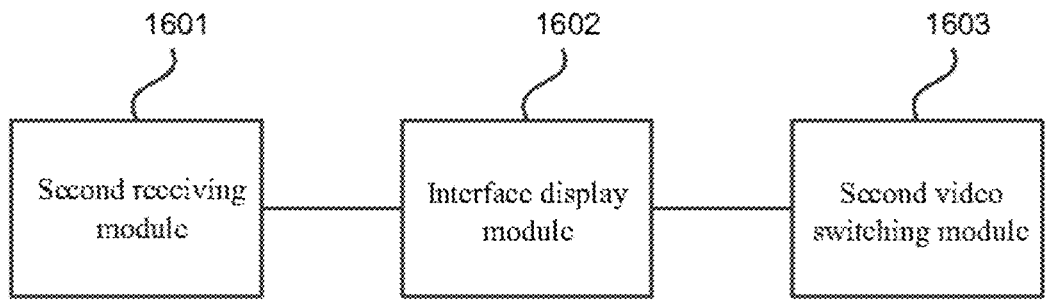
FIG. 16 is a structural block diagram of another interactive apparatus provided by an embodiment of the present disclosure.

FIG. 16 is a structural block diagram of an interactive apparatus provided by an embodiment of the disclosure. The apparatus can be implemented by software and/or hardware, and can be configured in an electronic device, typically, it can be configured in a mobile phone or a tablet. Interaction can be achieved by implementing interactive methods. As shown in FIG. 16, the interactive apparatus provided in this embodiment can comprise: a second receiving module 1601, an interface display module 1602, and a second video switching module 1603, wherein:

The second receiving module 1601 is configured to receive a third trigger operation to enter a target video room opened by a target user;

The interface display module 1602 is configured to display a second display interface of the target video room in response to the third trigger operation, and play the received first video in the second display interface, the first video being the video played within the target video room;

The second video switching module 1603 is configured to play a second video in the second display interface when it is detected that the first video is switched to the second video.

In this embodiment, by adopting above technical solutions, through the second receiving module, a third trigger operation to enter the target video room opened by the target user is received; through the interface display module, in response to the third trigger operation, the second display interface of the target video room is displayed, and the received first video played within the target video room is played in the second display interface, and through the second video switching module, when it is detected that the first video is switched to the second video, the second video is played in the second display interface. In this embodiment, by adopting above technical solutions, different videos can be played in the display interface of the target video room, which can improve the experience of the user entering a room and watching a video together with other users.

Further, the interactive apparatus provided in this embodiment can further comprise: a cyclical play module, configured to, after the playing the received first video in the second display interface, when the next video is not received after playing of the first video is finished, cyclically play the first video in the second display interface.

Further, the interactive apparatus provided in this embodiment can further comprise: a permission request module, configured to, after the displaying the second display interface of the target video room, when a fourth trigger operation for applying for video control permission of the target video room is received, send a permission request message to the target user to apply for the video control permission from the target user; an instruction sending module, configured to, for the case that the target user enables the video control permission for the local end user, if a fifth trigger operation is received for controlling the video played within the target video room, generate a video control instruction, and send the video control instruction to the target peer terminal of the target user to control the video played within the target video room.

Further, the interactive apparatus provided in this embodiment can further comprise: a sharing request module, configured to, after the displaying the second display interface of the target video room, send a sharing request message to the target user when a sixth trigger operation for applying for video sharing is received; a video sharing module, configured to receive a sharing feedback message sent by the target user based on the sharing request message, play a third video in the second display interface, and display a third interaction Control, wherein the third video is used to be played on the peer terminals of individual peer users located within the target video room, and the peer users includes the target user.

Further, the interactive apparatus provided in this embodiment can further comprise: a first control display module, configured to, after the displaying the second display interface of the target video room, when it is detected that the target user leaves the target video room, display a call control; a call module, configured to, when a seventh trigger operation acting on the call control is received, send a call message to the target user to call the target user to return to the target video room.

In the above solution, the third trigger operation may be a second click operation acting on a second room control in a second video playback interface. The interactive apparatus provided in this embodiment can further comprise: a second control display module, configured to, before the receiving the third trigger operation to enter the target video room opened by the target user, display a second video playback interface, and display the second room control of the target video room in the second video playback interface.

The interactive apparatus provided by the embodiments of the present disclosure can execute the interactive methods provided by any embodiment of the present disclosure, and has functional modules and beneficial effects corresponding to implementation of the interactive methods. Technical details not described in detail in this embodiment can be referred to the interactive methods provided in any embodiment of the present disclosure.

Below refer to FIG. 17, which shows a schematic structural diagram of an electronic device (such as a terminal device) 1700 suitable for implementing embodiments of the present disclosure. The terminal device in the embodiments of the present disclosure may include but not limited to a mobile terminal such as a mobile phone, a notebook, a digital broadcast receiver, a PDA (Personal Digital Assistant), a PAD (tablets), a PMP (Portable Multimedia Player), a vehicle-mounted terminal (such as a car navigation terminal) etc. and a fixed terminal such as a digital TV, a desktop computer, etc. The electronic device shown in FIG. 17 is only one example, and should not bring any limitation to the functions and scope of usages of the embodiments of the present disclosure.

Figure 17:
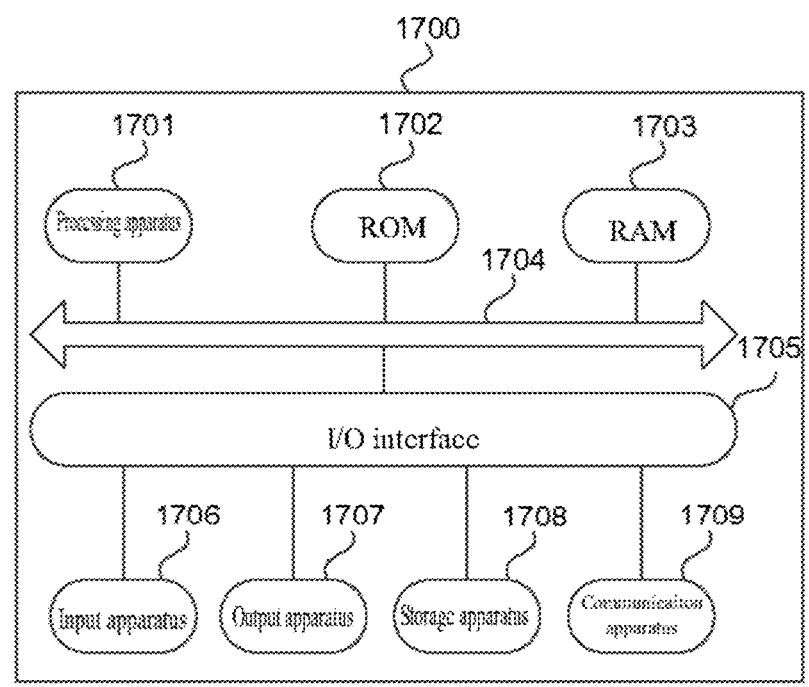
FIG. 17 is a schematic structural diagram of an electronic device provided by an embodiment of the disclosure.

As shown in FIG. 17, the electronic device 1700 may include a processing apparatus (for example a central processing unit, a graphics processor, etc.) 1701, which can execute various appropriate actions and processes according to a program stored in a read-only memory (ROM) 1702 or a program loaded from a storage apparatus 1706 into a random access memory (RAM) 1703. In the RAM 1703, various programs and data required for the operation of the electronic device 1700 are also stored. The processing apparatus 1701, ROM 1702, and RAM 1703 are connected to each other through a bus 1704. An input/output (I/O) interface 1705 is also connected to the bus 1704.

Generally, the following apparatus can be connected to the I/O interface 1705: an input device 1706 including for example, a touch screen, a touch pad, a keyboard, a mouse, a camera, a microphone, an accelerometer, a gyroscope, etc.; an output device 1707 including for example, a liquid crystal display (LCD), a speaker, a vibrator, etc.; a storage apparatus 1708 including for example, a magnetic tape, a hard disk, etc.; and a communication apparatus 1709. The communication apparatus 1709 may allow the electronic device 1700 to perform wireless or wired communication with other devices to exchange data. Although FIG. 17 shows an electronic device 1700 having various apparatus, it should be understood that it is not required to implement or have all of the illustrated apparatus. It can alternatively be implemented or provided with more or fewer apparatus.

In particular, according to an embodiment of the present disclosure, the process described above with reference to the flowchart can be implemented as a computer software program. For example, an embodiment of the present disclosure includes a computer program product, which includes a computer program carried on a non-transitory computer readable medium, and the computer program contains program code for executing the method shown in the flowchart. In such an embodiment, the computer program may be downloaded and installed from the network through the communication apparatus 1709, or installed from the storage apparatus 1706, or installed from the ROM 1702. When the computer program is executed by the processing apparatus 1701, the above-mentioned functions defined in the methods of the embodiments of the present disclosure are executed.

It should be noted that the aforementioned computer-readable medium in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, and the program may be used by or in combination with an instruction execution system, apparatus, or device. In the present disclosure, a computer-readable signal medium may include a data signal propagated in a baseband or as a part of a carrier wave, in which a computer-readable program code is carried. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination thereof.

In some embodiments, the client and server can communicate with any currently known or future developed network protocol such as HTTP (HyperText Transfer Protocol), and can interconnect with digital data communication (for example, communication network) in any form or medium. Examples of communication networks include local area networks ("LAN"), wide area networks ("WAN"), international network (for example, the Internet), and end-to-end networks (for example, ad hoc end-to-end networks), as well as any currently known or future developed networks.

The aforementioned computer-readable medium may be included in aforementioned electronic devices; or it may exist alone without being assembled into the electronic device.

The aforementioned computer-readable medium carries one or more programs, which, when executed by the electronic device, cause the electronic device: receiving a first trigger operation to open a target video room when a first video is played in a first video playback interface, the first video playback interface having a first interactive control displayed therein; in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room; switching the first video played in the first display interface to a second video when a video switching operation is received, wherein the second video is used to be played on a peer terminal of individual peer users located within the target video room. Or, receiving a third trigger operation to enter a target video room opened by a target user; in response to the third trigger operation, displaying a second display interface of the target video room, and playing the received first video in the second display interface, the first video being the video played within the target video room; playing a second video in the second display interface when it is detected that the first video is switched to the second video.

The computer program code for performing the operations of the present disclosure can be written in one or more programming languages or a combination thereof. The aforementioned programming languages include but are not limited to object-oriented programming languages such as Java, Smalltalk, C++, and include conventional procedural programming languages such as "C" language or similar programming languages. The program code can be executed entirely on a user's computer, partly executed on a user's computer, executed as an independent software package, partly executed on a user's computer and partly executed on a remote computer, or entirely executed on a remote computer or server. In the case of involving a remote computer, the remote computer can be connected to a user's computer through any kind of network, including a local area network (LAN) or a wide area network (WAN), or it can be connected to an external computer (for example, connected by using Internet provided by an Internet service provider).

The flowcharts and block diagrams in the accompanying drawings illustrate possible architecture, function, and operation implementations of a system, method, and computer program product according to various embodiments of the present disclosure. In this regard, each block in a flowchart or block diagram may represent a module, program segment, or part of code, which contains one or more executable instructions for realizing specified logic functions. It should also be noted that, in some alternative implementations, functions marked in a block may also occur in a different order than the order marked in the drawings. For example, two blocks shown in succession can actually be executed substantially in parallel, and they can sometimes be executed in the reverse order, depending on functions involved. It should also be noted that each block in a block diagram and/or flowchart, and the combination of blocks in a block diagram and/or flowchart, can be implemented by a dedicated hardware-based system that performs the specified functions or operations, or it can be implemented by a combination of dedicated hardware and computer instructions.

The units involved in the embodiments of the present disclosure can be implemented in software or hardware. Wherein, the name of the module does not constitute a limitation on the unit itself under certain circumstances.

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, Example 1 provides an interactive method comprising:
receiving a first trigger operation to open a target video room when a first video is played in a first video playback interface, the first video playback interface having a first interactive control displayed therein;
in response to the first trigger operation, opening the target video room for a local end user, displaying a first display interface of the target video room, playing the first video in the first display interface, and displaying the first interactive control, wherein the first video is used to be played on a peer terminal of individual peer users located within the target video room;
switching the first video played in the first display interface to a second video when a video switching operation is received, wherein the second video is used to be played on a peer terminal of individual peer users located within the target video room.

According to one or more embodiments of the present disclosure, Example 2, according to the method of Example 1, after the opening the target video room for the local end user, the method further comprises:
receiving a second trigger operation for switching current display interface to a non-video playback interface;
in response to the second trigger operation, switching current display interface to the non-video playback interface, displaying the first display interface in the form of a floating window in the non-video playback interface, and playing the last first video played in the first video playback interface within the first display interface.

According to one or more embodiments of the present disclosure, Example 3, according to the method of Example 1, after the opening the target video room for the local end user, the method further comprises:
receiving a first feedback operation of a permission request message sent by the local end user to the target peer user;
in response to the first feedback operation, enabling the video control permission for the target video room for the target peer user, and upon receiving a video control instruction sent by the target peer user, controlling the first video based on the video control instruction to control the video played within the target video room.

According to one or more embodiments of the present disclosure, Example 4, according to the method of Example 1, after the opening the target video room for the local end user, the method further comprises:
receiving a second feedback operation of a share request message sent by the local end user to the target peer user;
in response to the second feedback operation, sending a sharing feedback message to the target peer user, and playing a second video played by the peer terminal of the target peer user in the first display interface.

According to one or more embodiments of the present disclosure, Example 5, according to the method of Example 1, after the opening the target video room for the local end user, the method further comprises:
receiving a third feedback operation of a call message sent by the local end user to the target peer user;
in response to the third feedback operation, returning to the target video room, displaying the first display interface, and continuing to play the video in the first display interface.

According to one or more embodiments of the present disclosure, Example 6, the method according to any one of Examples 1-5, after the displaying the first display interface of the target video room, the method further comprises:
displaying a first room control in the first display interface, and when a first click operation acting on the first room control is detected, displaying user information of individual peer users located within the target video room.

According to one or more embodiments of the present disclosure, Example 7 provides an interactive method, comprising:
receiving a third trigger operation to enter a target video room opened by a target user;

in response to the third trigger operation, displaying a second display interface of the target video room, and playing the received first video in the second display interface, the first video being the video played within the target video room;

playing a second video in the second display interface when it is detected that the first video is switched to the second video.

According to one or more embodiments of the present disclosure, Example 8, according to the method of Example 7, after the playing the received first video in the second display interface, the method further comprises:

if the next video is not received after playing of the first video is finished, then the first video is cyclically played within the second display interface.

According to one or more embodiments of the present disclosure, Example 9, according to the method of Example 7, characterized in that, after the displaying the second display interface of the target video room, the method further comprises:

when a fourth trigger operation for applying for video control permission of the target video room is received, sending a permission request message to the target user to apply for the video control permission from the target user;

for the case that the target user enables the video control permission for the local end user, if a fifth trigger operation is received for controlling the video played within the target video room, generating a video control instruction, and sending the video control instruction to the target peer terminal of the target user to control the video played within the target video room.

According to one or more embodiments of the present disclosure, Example 10, according to the method of Example 7, after the displaying the second display interface of the target video room, the method further comprises:

sending a sharing request message to the target user when a sixth trigger operation for applying for video sharing is received;

receiving a sharing feedback message sent by the target user based on the sharing request message, playing a third video in the second display interface, and displaying a third interactive control, wherein the third video is used to be played on the peer terminals of individual peer users located within the target video room, and the peer users includes the target user.

According to one or more embodiments of the present disclosure, Example 11, the method according to Example 7, after the displaying the second display interface of the target video room, the method further comprises:

when it is detected that the target user leaves the target video room, displaying a call control;

when a seventh trigger operation acting on the call control is received, sending a call message to the target user to call the target user to return to the target video room.

According to one or more embodiments of the present disclosure, Example 12, according to the method of any one of Examples 7-11, the third trigger operation is a second click operation acting on a second room control in a second video playback interface, and before the receiving the third trigger operation to enter the target video room opened by the target user, the method further comprises:

displaying the second video playback interface, and displaying the second room control of the target video room in the second display interface.

According to one or more embodiments of the present disclosure, Example 13 provides an interactive apparatus, comprising:

a first receiving module configured to receive a first trigger operation to open a target video room when a first video is played in a first video playback interface, the first video playback interface having a first interactive control displayed therein;

a room opening module configured to open the target video room for a local end user in response to the first trigger operation, display a first display interface of the target video room, play the first video in the first display interface, and display the first interactive control, wherein the first video is used to be played on a peer terminal of individual peer users located within the target video room;

a first video switching module configured to switch the first video played in the first display interface to a second video when a video switching operation is received, wherein the second video is used to be played on a peer terminal of individual peer users within the target video room.

According to one or more embodiments of the present disclosure, Example 14 provides an interactive apparatus, comprising:

a second receiving module configured to receive a third trigger operation to enter a target video room opened by a target user;

an interface display module configured to display a second display interface of the target video room in response to the third trigger operation, and play the received first video in the second display interface, the first video being the video played within the target video room;

a second video switching module configured to play a second video in the second display interface when it is detected that the first video is switched to the second video.

According to one or more embodiments of the present disclosure, Example 15 provides an electronic device, comprising:

one or more processors;

a memory used to store one or more programs, when the one or more programs are executed by the one or more processors, cause the one or more processors implement the interactive methods according to any one of claims 1-12.

According to one or more embodiments of the present disclosure, Example 16 provides a computer-readable storage medium having a computer program stored thereon, the program, when executed by a processor, implements the interactive methods according to any one of Examples 1-12.

The above description is only preferred embodiments of the present disclosure and an explanation to the technical principles applied. Those skilled in the art should understand that the scope of disclosure involved in this disclosure is not limited to technical solutions formed by specific combination of above technical features, and should also cover other technical solutions formed by arbitrarily combining above technical features or equivalent features thereof without departing from above disclosed concept. For example, those technical solutions formed by exchanging of above features and technical features disclosed in the present disclosure (but not limited to) having similar functions with each other.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in a language specific to structural features and/or logical actions of the method, it should be understood that the subject matter defined in the appended claims is not necessarily limited to the specific features or actions described above. Rather, the specific features and actions described above are merely exemplary forms of implementing the claims.

What is claimed is:

1. An interactive method, comprises:
   receiving a first trigger operation from a local end user to enable a target video sharing when a first video that the local end user wishes to share with other users is played in a first video playback interface, the first video playback interface having a first interactive control displayed therein;
   in response to the first trigger operation, enabling the target video sharing for a local end user, displaying a first display interface of the target video sharing, playing the first video in the first display interface, and displaying the first interactive control, wherein the first video is used to be played on a peer terminal of individual peer users of the target video sharing and when the first video is displayed on the peer terminal of the individual peer users, the information of an interaction conducted by the local end user with the first video displayed on the first display interface is not sent to the peer terminal of the individual peer users and therefore the interaction conducted by the local end user is not seen by the individual peer users on their respective peer terminals, wherein the interaction conducted by the local end user with the first video comprises one or more of the following: follow operation for a publisher of the first video, like operation for the first video, comment operation for the first video and repost operation for the first video; and
   switching the first video played in the first display interface to a second video when a video switching operation is received, wherein the second video is used to be played on the peer terminal of individual peer users,
   after the enabling the target video sharing for the local end user, receiving a second trigger operation for switching current display interface to a non-video playback interface; and
   in response to the second trigger operation, switching current display interface to the non-video playback interface, displaying the first display interface in a form of a floating window in the non-video playback interface, and playing a last one of the first video played in the first video playback interface within the first display interface,
   wherein the interactive method further comprises:
   in response to receiving a video control instruction sent by a target peer user of the target video sharing, controlling the first video based on the video control instruction to control the first video played in the target video sharing, wherein the video control instruction comprises one or more of: video switching controlling instruction, video playing instruction, video pausing instruction, and video playing progress controlling instruction for the first video currently being played in the target video sharing.

2. The method of claim 1, after the enabling the target video sharing for the local end user, the method further comprises:
   receiving a second feedback operation of a share request message sent by the local end user to the target peer user;
   in response to the second feedback operation, sending a sharing feedback message to the target peer user, and playing a second video played by the peer terminal of the target peer user in the first display interface.

3. The method according to claim 1, after the enabling the target video sharing for the local end user, the method further comprises:
   receiving a third feedback operation of a call message sent by the local end user to the target peer user;
   in response to the third feedback operation, returning to the target video sharing, displaying the first display interface, and continuing to play the first video in the first display interface.

4. The method according to claim 1, after the displaying the first display interface of the target video sharing, the method further comprises:
   displaying a first sharing control in the first display interface, and when a first click operation acting on the first sharing control is detected, displaying user information of individual peer users of the target video sharing.

5. The method according to claim 1, further comprising:
   receiving a third trigger operation to enter a target video sharing enabled by a target user;
   in response to the third trigger operation, displaying a second display interface of the target video sharing, and playing the first video as received in the second display interface, the first video being the video played within the target video sharing;
   playing a second video in the second display interface when it is detected that the first video is switched to the second video.

6. The method according to claim 5, after the playing the first video as received in the second display interface, the method further comprises:
   if a next video is not received after playing of the first video is finished, then the first video is cyclically played within the second display interface.

7. The method according to claim 5, after the displaying the second display interface of the target video sharing, the method further comprises:
   when a fourth trigger operation for applying for video control permission of the target video sharing is received, sending a permission request message to the target user to apply for the video control permission from the target user;
   for a scenario that the target user enables the video control permission for a local end user, if a fifth trigger operation is received for controlling the video played within the target video sharing, generating a video control instruction, and sending the video control instruction to the target peer terminal of the target user to control the second video played within the target video sharing.

8. The method according to claim 5, after the displaying the second display interface of the target video sharing, the method further comprises:

sending a sharing request message to the target user when a sixth trigger operation for applying for video sharing is received;

receiving a sharing feedback message sent by the target user based on the sharing request message, playing a third video in the second display interface, and displaying a third interactive control, wherein the third video is used to be played on peer terminals of individual peer users of the target video sharing, and the peer users includes the target user.

9. The method according to claim 5, after the displaying the second display interface of the target video sharing, the method further comprises:

when it is detected that the target user leaves the target video sharing, displaying a call control;

when a seventh trigger operation acting on the call control is received, sending a call message to the target user to call the target user to return to the target video sharing.

10. The method according to claim 5, the third trigger operation is a second click operation acting on a second sharing control in a second video playback interface, and before the receiving the third trigger operation to enter the target video sharing enabled by the target user, the method further comprises:

displaying the second video playback interface, and displaying the second sharing control of the target video sharing in the second display interface.

11. An electronic device, comprises:

one or more processors;

a memory used to store one or more programs, when the one or more programs are executed by the one or more processors, cause the one or more processors implement the interactive method according to claim 1.

12. A non-transitory computer-readable storage medium having a computer program stored thereon, the program, when executed by a processor, implements the interactive method according to claim 1.

\* \* \* \* \*